United States Patent [19]  [11] 3,940,736
Inaba et al.  [45] Feb. 24, 1976

[54] DIGITAL CODE MONITOR SYSTEM

[75] Inventors: Hiroshi Inaba; Etsugo Yoneda, both of Yokohama, Japan

[73] Assignee: Nippon Telegraph and Telephone Public Corporation, Tokyo, Japan

[22] Filed: July 24, 1974

[21] Appl. No.: 491,306

[30] Foreign Application Priority Data
Aug. 2, 1973  Japan............................... 48-87007
Aug. 22, 1973  Japan............................... 48-94742

[52] U.S. Cl................. 340/146.1 A; 340/146.1 AG; 340/146.1 AJ; 340/146.1 AL; 340/146.1 AX; 340/146.1 D; 325/41
[51] Int. Cl.².......................................... H04L 1/10
[58] Field of Search............ 340/146.1 A, 146.1 AJ, 340/146.1 AL, 146.1 AX, 146.1 AG, 146.1 D; 325/41

[56] References Cited
UNITED STATES PATENTS
3,437,995  4/1969  Watts.................. 340/146.1 AL X
3,646,517  2/1972  Waters et al........ 340/146.1 AX UX

*Primary Examiner*—R. Stephen Dildine, Jr.
*Attorney, Agent, or Firm*—Burgess Ryan and Wayne

[57] ABSTRACT

A system for monitoring the transmission of a digital code is disclosed wherein a block consisting of a predetermined number of bits is extracted at a predetermined cycle from an information pulse train before the bit rate conversion thereof so that a check code corresponding to the states of this block may be formed, and inserted into the time slots formed by the bit rate conversion of the information pulse train, and the check code with the information pulse train after bit rate conversion, is transmitted to a receiving equipment. In the receiving equipment, a check code is formed from the received information pulse train, whose bit rate is restored to its original rate, in a manner exactly similar to that used in the transmitting equipment and is compared with the transmitted check code, that is, the check code is extracted from the received pulse train. Therefore, the whole transmission system including the channel before a bit rate converter in the transmitting equipment and the channel after a bit rate converter in the receiving equipment may be monitored.

5 Claims, 10 Drawing Figures

DIGITAL CODE MONITOR SYSTEM

BACKGROUND OF THE INVENTION

The present invention relates to generally a digital code transmission system and more particularly to a digital code monitor system wherein check codes are inserted into the time slots formed by the bit rate conversion of the information pulse train.

The conventional digital code monitor systems of the type described above may be divided into the following three systems;

1. the first system in which a specific pattern such as a pseudo random pattern consisting of more than one digit signal is transmitted for each frame which equals the repetitive interval of time slots newly formed by the bit rate conversion, and is detected for monitoring of its error on a receiving side;

2. in the second system in which the combination of an information pulse train and a check code in each frame has specific add or even characteristics odd or even in the specific state of the Q-ary and R-level code, for instance, the state of "1" or "0" in the binary code, is transmitted, and said specific characteristic is checked.

3. in the third system the number of digits in the specific state of the Q-ary and R-level code, for instance, the number of "1" or "0" in the binary code, in each frame are summed, and a check code is formed based upon the sum is inserted into the time slots formed by the bit rate conversion. The resulting signal is transmitted, and compared with a check code formed in a manner substantially similar to that used in the transmitting equipment.

In the monitor systems of the types described, the check codes or monitor signals are formed based upon the information pulse train whose bit rate is converted in the transmitting equipment so that the section in a transmission system which can be monitored by any of the above three monitor systems is limited from the point immediately after the information pulse trains are subjected to the bit rate conversion in the transmitting equipment to the point immediately before the bit rate converted pulse train are restored to their normal bit rate in the receiving equipment. Therefore, a malfunction in the transmission systems before and after the bit rate converters cannot be detected so that the automatic switching to an auxiliary circuit or circuits cannot be made. Furthermore, it takes a long time before the malfunction can be detected.

SUMMARY OF THE INVENTION

One of the objects of the present invention is therefore to provide a digital code monitor system capable of monitoring the entire transmission system, including those channels before and after the bit rate converters in the transmitting and receiving equipments, respectively.

Another object of the present invention is to provide a digital code monitor system characterized in that in transmitting equipment, a check code is formed for an information pulse train before it is subjected to the bit rate conversion from the timing pulse before the bit rate conversion or before and after the bit rate conversion, and in receiving equipment, where a check code for the information pulse train whose bit rate is restored is formed from the timing pulses before the bit rate conversion or before and after the bit rate conversion, and compared with the check code extracted from the received pulse train.

A further object of the present invention is to provide for transmitting equipment, a digital code monitor system in which the control timing in response to which is formed a check code for an information pulse train prior to the bit rate conversion thereof, and to provide receiving equipment wherein the control timing in response to which is formed a check code for the information pulse train after the bit rate conversion thereof for the restoration of its original bit rate, occurs within a predetermined time interval after a frame synchronizing pulse is inserted into the information pulse train after the bit rate conversion thereof in the transmitting equipment.

A further object of the present invention is to provide a digital code monitor system in which the control timing, in response to which is formed a check code in the receiving equipment, is synchronized with the control timing in response to which is formed in the transmitting equipment, the check code from the timing pulses before the bit rate conversion or before and after the bit rate conversion of the information pulse train. The synchronization is accomplished by shifting said control timing in the receiving equipment, in response to which is formed the check code from the timing pulses after and prior to the bit rate conversion of the pulse train, in response to the integrated value of the error pulses derived from an error detection circuit when the check code formed in the receiving equipment does not coincide with the check code extracted from the received pulse train.

A further object of the present invention is to provide a digital code monitor system in which the capacity of a memory which is used for the bit rate conversion of the pulse train is an integral submultiplier of the number of information bits in each frame.

Briefly stated according to the present invention, the time slot number of information bits in each frame are correlated with the addresses in a memory of transmitting or receiving equipment. In the transmitting equipment a block consisting of a predetermined number of bits is extracted from the information pulse train before the bit rate conversion thereof at a predetermined frequency so as to form a check code for this block. The check code is inserted into the time slots prepared by the bit rate conversion of the information pulse train and transmitted to receiving equipment. In the receiving equipment this check code is extracted from the received pulse train. In the receiving equipment a block consisting of a predetermined number of bits is extracted from information pulse train, whose bit rate is restored to its original rate, at a predetermined frequency so as to form a check code for this block in a manner exactly similar to that used in the transmitting equipment. The check code newly formed in the receiving equipment is compared with the check code transmitted and extracted in the receiving equipment.

According to another embodiment of the present invention, in the transmitting equipment, a block consisting of a predetermined number of bits is extracted in response to a control timing signal at a predetermined frequency from an information pulse train before it is subjected to the bit rate conversion so as to form a check code for this block. The check code thus formed is inserted into the time slots prepared by the bit rate conversion of the information pulse train and transmitted to receiving equipment. In the receiving equipment, this check code is extracted from the received pulse train. Meanwhile in the receiving equipment a block consisting of a predetermined number of bits is extracted in response to a control timing signal at a predetermined frequency from the received information pulse train which is restored to its original bit rate so as to form a check code in a manner exactly similar to that used in the transmitting equipment. The newly formed check code is compared with the extracted check code, and error pulses are derived when they do not coincide with each other. When the error pulses are derived at a rate in excess of a predetermined frequency, the control timing signals in response to which is formed the check code in the receiving equipment are shifted in phase until the error pulse or signal frequency becomes lower than a predetermmined rate. Thus, the digital code monitor system in accordance with the present invention may monitor the whole transmission system even before the bit rate conversion of an information pulse train is started in the transmitting equipment and even after the received information pulse train is restored to its original bit rate in the receiving equipment.

DESCRIPTION OF THE PREFERRED EMBODIMENTS

Figure 1:
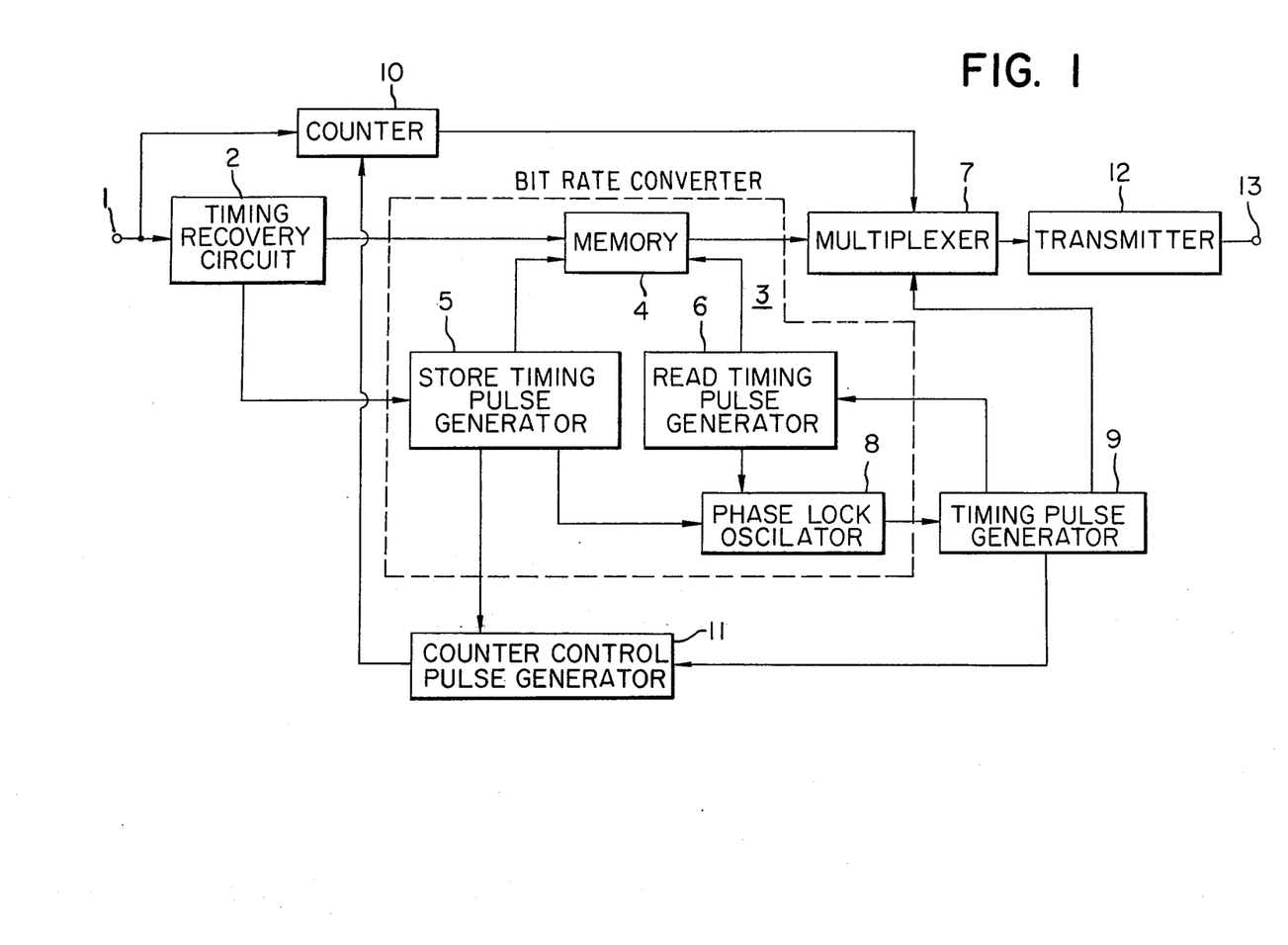
FIG. 1 is a block diagram of a transmitting equipment of a first embodiment of the present invention.
Figure 2:
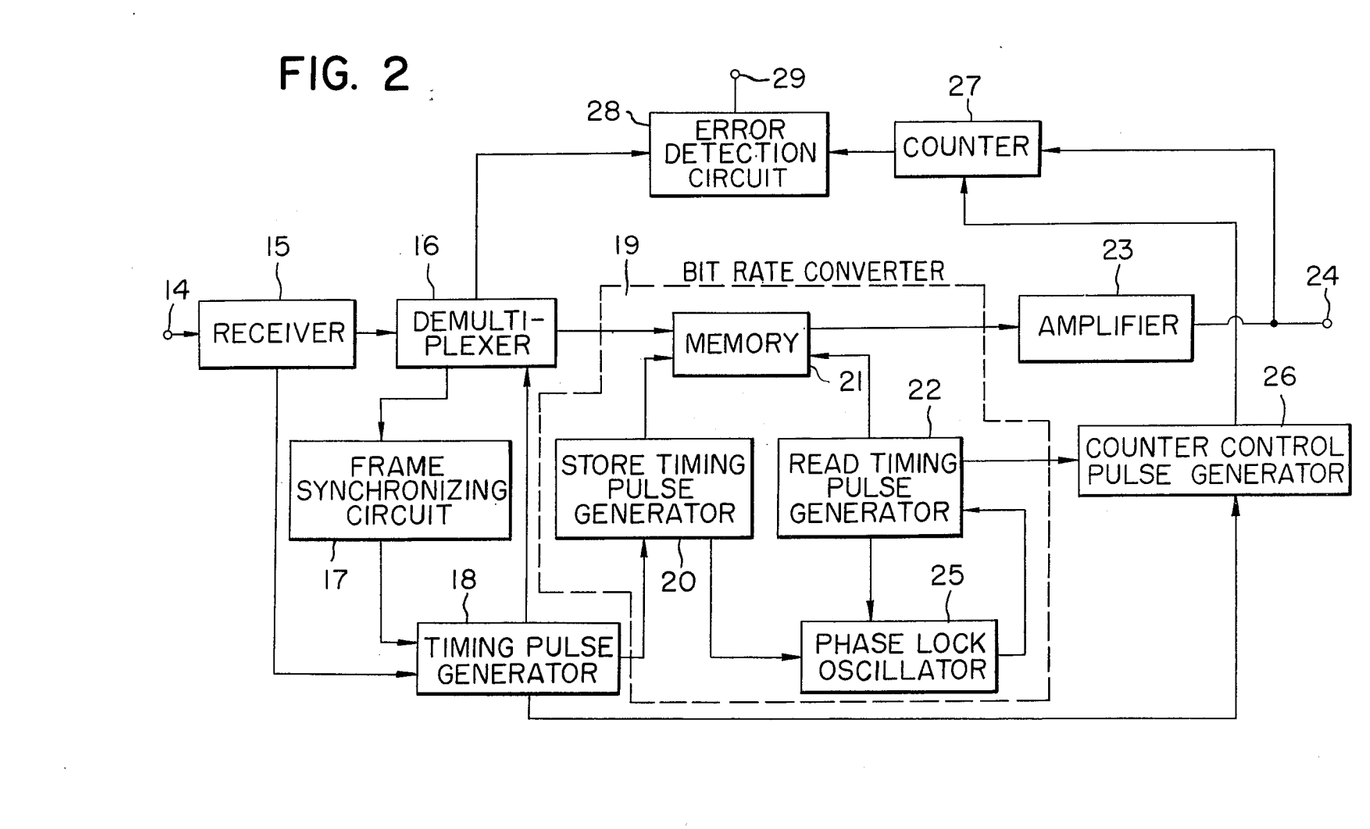
FIG. 2 is a block diagram of a receiving equipment thereof.
Figure 3:
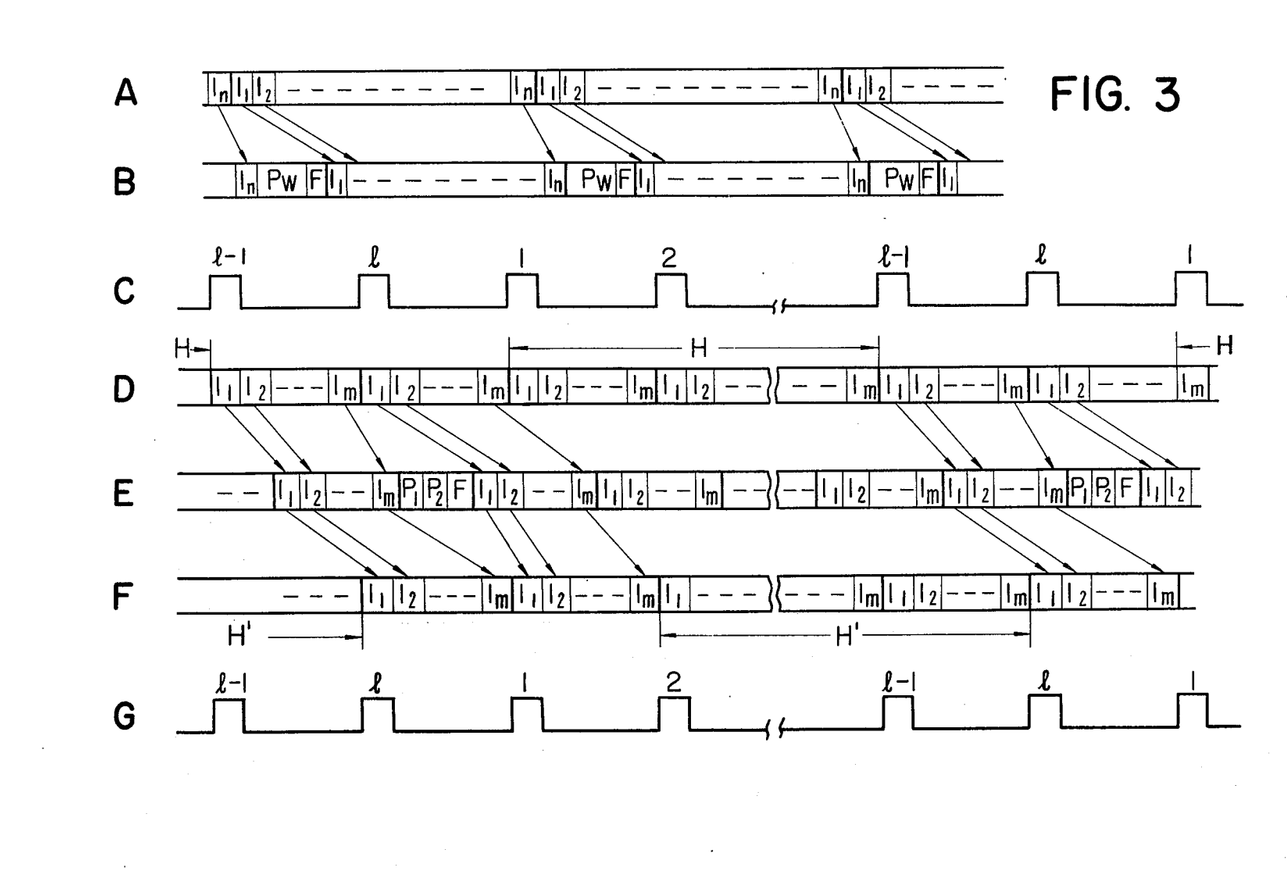
FIG. 3 is a time chart used for the explanation of the mode of operation of the first embodiment.

First Embodiment, FIGS. 1, 2, and 3

Referring to FIGS. 1, 2, and 3 illustrating the first embodiment of the digital code monitor system in accordance with the present invention, and more particularly FIG. 1 illustrating in block diagram the transmitter equipment, a train of information signals of the type shown in FIG. 3 at A is transferred from an input terminal 1 into a memory 4 in a bit rate converter 3 through a timing recovery circuit 2 so that the information pulse train may be continuously stored in the memory 4 in response to the store timing pulses derived from a store timing pulse generator 5 which in turn is actuated in response to the clock pulses transmitted from the timing recovery circuit 2. In response to the read timing pulses which are derived from a read timing pulse generator 6 and whose frequency is slightly higher than that of the store timing pulses, an information pulse train of $n$ bits is continuously read out from the memory 4 and transferred into a multiplexer 7. The output of a phase lock oscillator 8, which is controlled not only by the store timing pulse from the store timing pulse generator 5 but also by the read timing pulse from the read timing pulse generator 6, drives a timing pulse generator 9 which in turn generates the timing pulses controlling the read timing pulse generator 6. Therefore when the $n$-bit pulse train is read out from the memory 4, reading is interrupted so that a frame synchronizing pulse from the pulse generator 9 may be transferred into the multiplexer 7 and inserted into an idle time slot prepared or constructed by the bit rate conversion of the information pulse train as shown in FIG. 3 at B. The check codes are inserted into the remaining idle slots $P_1, P_2, \ldots$, and $P_w$ (where $w =$ an integer) as shown in FIG. 3. Consequently, after the bit rate conversion each frame of the pulse train consists of $n$ information bits $I_1, I_2, \ldots$, and $I_n$, $w$ check bits $P_1, P_2, \ldots$, and $p_w$, and the frame synchronizing bit F, as shown in FIG. 3 at B. The symbols $I_1$ through $I_n$ shown in FIG. 3 at A correspond to the information bits $I_1$ through $I_n$ in each frame shown in FIG. 3 at B. The check codes are formed by deriving a block consisting of a predetermined number of bits from the information pulse train before it is subjected to the bit rate conversion at a predetermined time interval and encoding the check bits representing the state of the pulse train in the block. For instance, a check code may be prepared by one of the following methods:

1. A check code is so constructed that the sum of information bits in each block and the bits of the check codes which bits are in a specific state, for instance "1" or "0" in case of the binary system, may be an odd or even number.

2. A check code may be the remainder obtained by dividing A by $k$ where A is a number of the bits of each block which are in a specific state, for instance "1" or "0" in case of the binary code, and $k$, an integer larger than 2 inclusive.

3. A check code may be so determined that the sum of information bits in each block and the check bit which bits are in a specific state, for instance "1" or "0" in case of the binary code, is equal to a predetermined number.

In addition to the above check codes, any check code may be used in the present invention, but in the instant embodiment, the check code of the types described above is used. That is, the check code is formed in accordance with the content in a counter 10 whose starting, stopping and reset operation is controlled by the output signals from a counter control pulse generator 11 which in turn is controlled by the output pulses of the store timing pulse generator 5 and the timing pulse generator 9. The pulse train converted in the manner described above is transmitted from an output terminal 13 of a transmitter 12 to a receiving equipment.

Next referring to FIG. 2 the receiving equipment of the first embodiment will be described. The pulse train received at an input terminal 14 is transferred through a receiver 15 into a demultiplexer 16 so that the check code and the frame synchronizing pulse may be extracted. The frame synchronizing pulse is applied to a frame syncronizing circuit 17 whose output is applied to a timing pulse generator 18. In response to the timing pulses in synchronism with the received pulse train and derived from the timing pulse generator 18, a store timing pulse generator 20 in a bit rate converter 19 generates the store timing pulses in response to which the information bits $I_1$ through $I_n$ may be continuously stored in a memory 21. The information stored in the memory 21 is continuously read out in response to the output pulses of a read timing pulse generator 22 (the frequency being slightly lower than that of the store timing pulse generator 20). The read out information pulse train having the same bit rate as that of the information pulse train applied to the input terminal 1 of the transmitter equipment (See FIG. 1) is amplified by an amplifier 23 and applied to an output terminal 24. A phase lock oscillator 25 is controlled not only by the output pulse of the store timing pulse generator 20 but also by the output pulse of the read timing pulse generator 22, and the read timing pulse generator 22 is driven by the output pulses of the phase lock oscillator 25 so that the frequency of the information pulse train derived from the output terminal 24 may equal to that of the input information pulse train applied to the input terminal 1 of the transmitter equipment.

A counter control pulse generator 26 is controlled by the output pulses of the timing pulse generator 18 and the read timing pulse generator 22, and a counter 27 is controlled by the output pulses of the counter control pulse generator 26 so that the check code may be formed from the information pulse train derived from the output terminal 24 in a manner substantially similar to that described hereinbefore. The check code derived from the counter 27 and the check code extracted by the demultiplexer 16 are applied to an error detection circuit 28 which provides the detected error pulses to a detected error pulse output terminal 29 when the two check codes do not coincide with each other.

When the number $n$ of information bits in each frame is so selected as to be an integral multiple of the capacity $m$ of the memories 4 and 21 of the bit rate converters 3 and 19, that is when $n = l \times m$ (where $l =$ an integer), there may be established a correspondence between the addresses in the memories 4 and 21 and the number of the information bits of each frame. FIG. 3C shows the store timing pulses in response to which information is stored in a memory address $M_1$ of the memory 4 in the transmitting equipment. When the above relation, that is, $n = l \times m$ is satisfied, information is written into the address $M_i$ ($i = 1, 2, \ldots, m$) a number of times $l$ for each frame. FIG. 3D shows the information pulse train $I_1$ through $I_m$ stored in each address of the memory 4. FIG. 3E shows the pulse train of the output terminal 13. FIG. 3F shows the information pulse train which is read out of the memory 21 and has the same bit rate as that of the information pulse train shown in FIG. 3D. FIG. 3G shows the read timing pulses in response to which the information stored in the address $M_1$ of the memory 21 is read out. When $n = l \times m$ is satisfied the address $M_i$ of the memory 4 in the transmitting equipment from which is read out the $x$-th ($x = 1, 2, \ldots, n$) information and the address $M_j$ of the memory 21 in the receiving equipment in which is stored the $x$-th information are invariable in any frame. Furthermore, the addresses $M_i$ and $M_j$ may be arbitrarily selected by means of the frame synchronizing pulse F. A counting interval H shown in FIG. 3D starts from the leading edge of the first store timing pulse 1 shown in FIG. 3C and ends at the leading edge of the $(l-1)$th store timing pulse $l-1$, and the number of information bits which are stored in the memory 4 and are in the specific state "1" or "0" are counted by the counter 10. The check code $P_1$, $P_2$ formed according to the content of the counter 10 are inserted immediately before the frame synchronizing pulse F. In like manner, a counting interval H' shown in FIG. 3E (in the receiving equipment) starts from the leading edge of the second store timing pulse and ends at the leading edge of the $l$-th timing pulse, and the number of information bits which are read out of the memory 21 and are in said specific state, are counted by the counter 27. The check code formed in accordance with the content of the counter 27 is compared with the transmitted check code in the error detection circuit 28 so that when they do not coincide with each other an error pulse is generated. Thus the error in code transmission may be detected and the monitor of the transmission equipment and line may be carried out. So far the counters 10 and 27 have been described as counting during the time intervals H and H', respectively, but it is to be understood that the intervals H and H' may be arbitrarily selected by deriving appropriately the pulses from the timing pulse generators 9 and 18 instead of the frame synchronizing pulses F, deriving appropriately the pulses from the store timing pulse generator 5 and the read timing pulse generator 22 applying the derived output pulses from the timing pulse generator 9 and the store timing pulse generator 5 to the counter control pulse generator 11, and applying the derived output pulses from the timing pulse generator 18 and the read timing pulse generator 22 to the counter control pulse generator 26.

Figure 4:
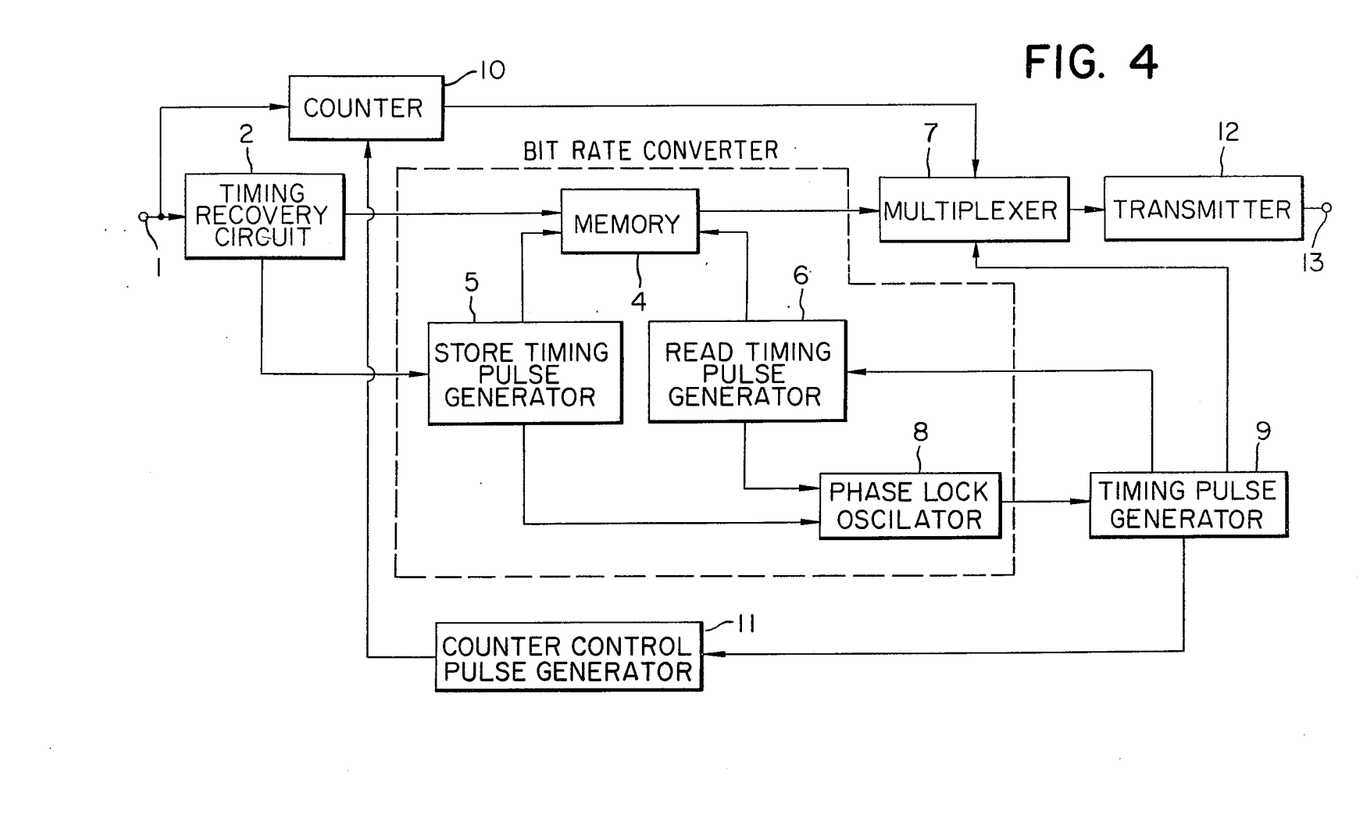
FIG. 4 is a block diagram of a transmitting equipment of a second embodiment of the present invention.
Figure 5:
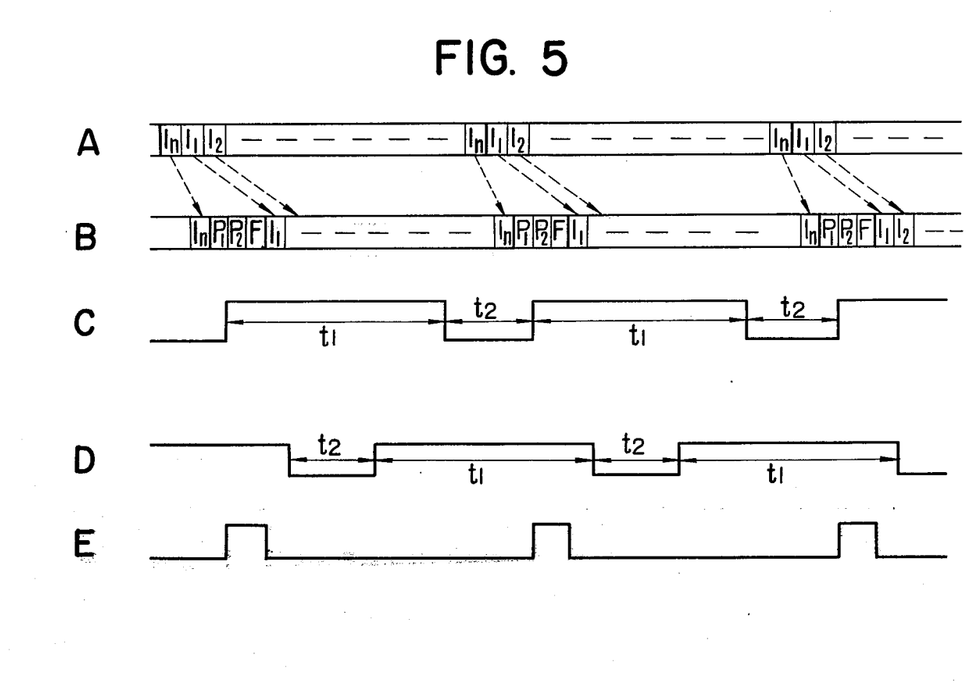
FIG. 5 is a time chart used for the explanation of the mode of operation thereof.
Figure 6:
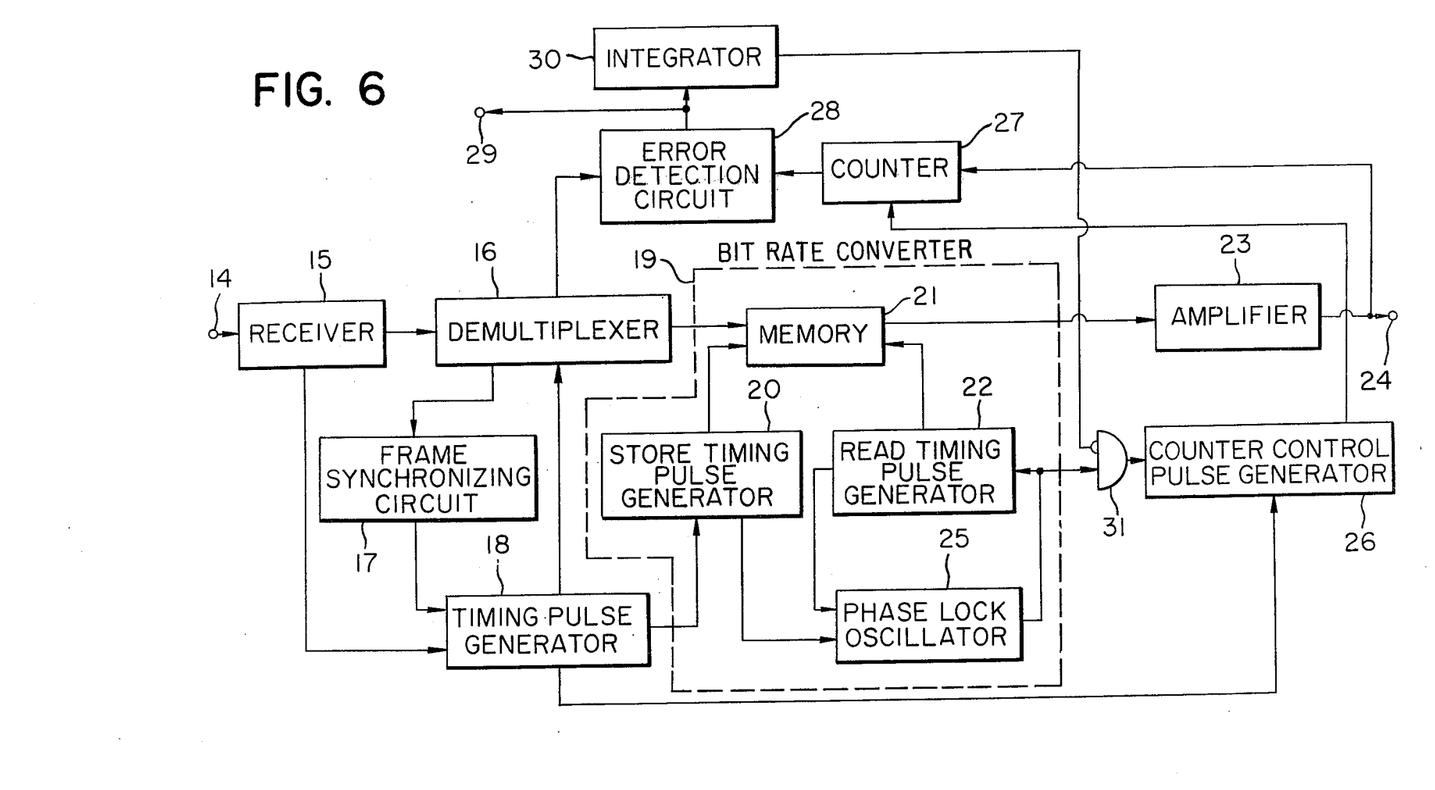
FIG. 6 is a block diagram of a receiving equipment of the second embodiment of the present invention.
Figure 7:
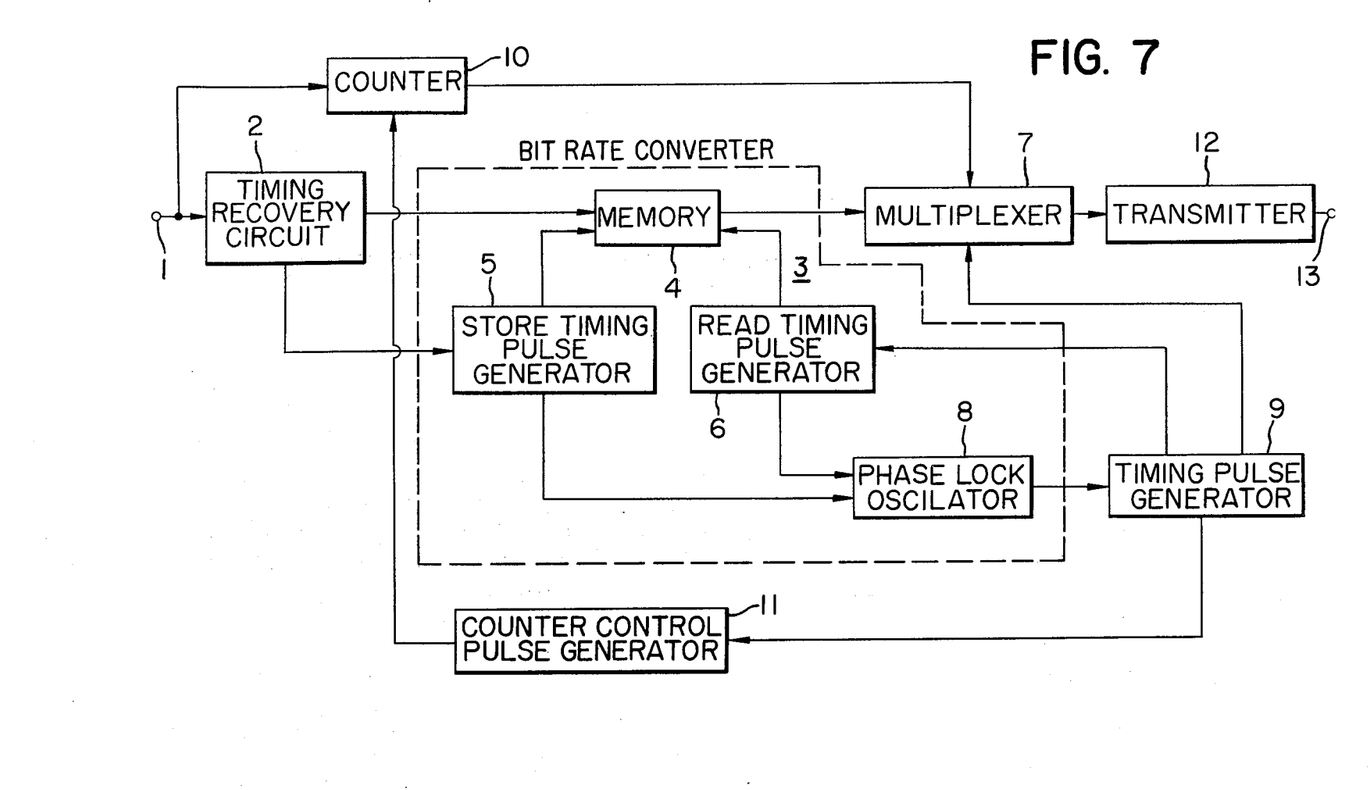
FIG. 7 is a block diagram of a transmitting equipment of a third embodiment of the present invention.

Second Embodiment, FIGS. 4, 5, and 6

The second embodiment of the present invention shown in FIGS. 4 and 6 is different from the first embodiment described hereinabove in that the number n of information bits in each frame is not required to be an integral multiplier of the capacity $m$ of the memory 4, that is, it is not necessary to satisfy the relation $n = l \times m$.

Referring to FIG. 5, the mode of operation of the transmitter equipment of the second embodiment will be described hereinafter. The bit rate of a pulse train consisting of the information shown in FIG. 5A is converted into the pulse train as shown in FIG. 5B. As shown in FIG. 5C the counter 10 is operated during a time interval $t_1$ in response to the control signal from the counter control pulse generator 11 so as to count the number of information bits in a predetermined state "1" or "0" of the pulse train stored in the memory 4 as shown in FIG. 5A. In the next time interval $t_2$ the counter 10 is stopped and reset for counting the specific bits in the next time interval $t_1$. The time intervals $t_1$ and $t_2$ are so selected that $t_1 + t_2$ may equal the period of one frame or an integral multiple thereof. The check code which is formed during the operating time $t_1$ by the counter 10 so as to be inserted together with the frame synchronizing pulse F at the end of the information pulse train consisting of $n$ information bits in the multiplexer 7 is stored in a memory of the counter 10 during the inoperative time interval $t_2$. The check code is read out from the memory of the counter 10 and applied to the multiplexer 7 to be inserted at the end of each information pulse train. It should be noted that the operation time $t_1$ of the counter 10 is not limited to one frame time. For instance the counter 10 may operate at a cycle as shown in FIG. 5D. The counter control pulse generator 11 generates the control pulses to be applied to the counter 10 in response to the timing pulses of the timing pulse generator 9, and the counter 10 is started, stopped or reset by the control pulses.

The bit-rate-converted pulse train with the frame synchronizing pulse F and the check code inserted therein is transmitted through the transmitter 12 from the output terminal 13 to the receiving equipment.

Next referring to FIG. 6 illustrating the receiving equipment of the second embodiment, the counter control pulse generator 26 operates during the time interval $t_1$ as in the case of the counter control pulse generator 11 in the transmitting equipment shown in FIG. 4, and interrupts its operation during the time interval $t_2$. Therefore, the counter 27 operates during the time interval $t_1$, but interrupts its operation during the time interval $t_2$. During the time interval $t_1$ the counter counts the number of information bits in the specific state in each frame so that the check code is formed and applied to the error detection circuit 28 to be compared with the check code extracted from the received pulse train in the demultiplexer 16 and applied to the circuit 28. When they do not coincide with each other, an error signal is derived from the output terminal 29.

In the second embodiment, when the control timing signals for controlling the formations of the check codes in the transmitting and receiving equipments, respectively, are synchronized, the error signal derived from the error detection circuit 28 represents that an error occurs in a code transmitted through a transmission system or that the transmission system has a failure. For this purpose, the counter 27 in the receiving equipment must count the same information pulse train as that counted by the counter 10 in the transmitting equipment. If the counting time intervals of the counters 10 and 27 are not in synchronism with each other, the error detection circuit provides frequent error signals. The error signals or pulses are integrated by an integrator 30 so that when the output of the latter is in excess of a predetermined value, an inhibit gate 31 inhibits the output of the phase lock oscillator 25 from being applied to the counter control pulse generator 26. That is, the counter control pulse generator 26 generates control pulses in response to the output pulses of the phase lock oscillator 25 so that the counter 27 operates during the time interval $t_1$ and interrupts its operation during the time interval $t_2$, but when the output of the integrator 30, which integrates the error pulses derived from the error detection circuit 28, becomes in excess of a predetermined value, the inhibit gate 31 inhibits the output pulses of the phase lock oscillator 25 from being applied to the counter control pulse generator 26. Consequently, the operating time interval $t_1$ and the inoperative time interval $t_2$ of the counter 27 are shifted in phase by the output pulses of the counter control pulse generator 26. That is, when the integrated value of the error pulses of the error detection circuit 28 is in excess of a predetermined value, the inhibit gate 31 is actuated so that the output pulses of the counter control pulse generator 26 are shifted in phase until the counting time interval of the counter 27 in the receiving equipment becomes in phase with that of the counter 10 in the transmitting equipment. When the counting time intervals are synchronized, no error signal or pulse is derived from the error detection circuit 28 as long as a malfunction of the transmission system does not occur. However when the error pulses appear very frequently even after a predetermined time interval required for synchronizing the counting time intervals has elapsed, there exists a malfunction or malfunctions of the component part or parts between the input terminal 1 and the output terminal 24. Thus the second embodiment of the present invention may monitor the whole transmission system.

Third Embodiments, FIGS. 7, 8, 9 and 10

In the second embodiment described hereinbefore with reference to FIGS. 4, 5, and 6, the phase of the control pulses of the counter control pulse generator 26 is gradually shifted in order to synchronize the operation of the counter 10 in the transmitting equipment with that of the counter 27 in the receiving equipment, but it takes a long time before they are synchronized when they are grossly out of phase with each other. In the third embodiment, in order to overcome this problem, the counter 10 is so arranged as to be actuated a predetermined time after the frame synchronizing pulse F, and the counter 27 in the receiving equipment is so controlled as to be actuated a predetermined time after the frame synchronizing pulse F extracted in the receiving equipment.

Figure 9:
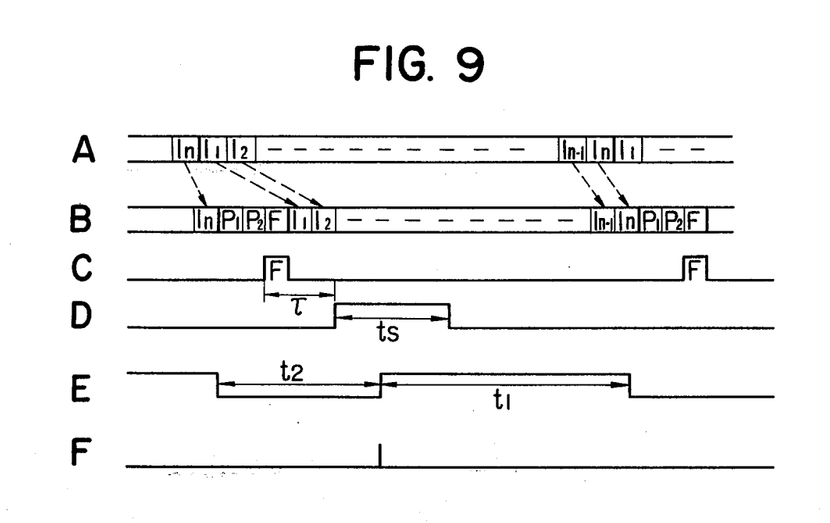
FIGS. 9 and 10 are time charts used to explain the mode of operation of the transmitting and receiving equipments shown in FIGS. 7 and 8, respectively.

Next the mode of operation of the transmitting equipment of the third embodiment will be described with reference to FIG. 9. The input information pulse train shown in FIG. 9A is converted into the pulse train shown in FIG. 9B by the bit rate conversion. A pulse shown in FIG. 9C is the frame synchronizing pulse F which is inserted into the information pulse train converted by the bit rate conversion and obtained from the timing generator 9. A pulse shown in FIG. 9D is obtained from the counter control pulse generator 11, appears at a time $\tau$ delayed from the frame synchronizing pulse F and decays at the time $\tau + t_s$. As shown in FIG. 9E, the counter 10 is so arranged as to start counting within the time interval $t_s$ and to operate during a time interval $t_1$ in response to the counter control pulse from the counter control pulse generator 11. FIG. 9F shows the point in time at which the counter 10 is activated so that it starts counting within a specific time interval $t_s$.

Figure 8:
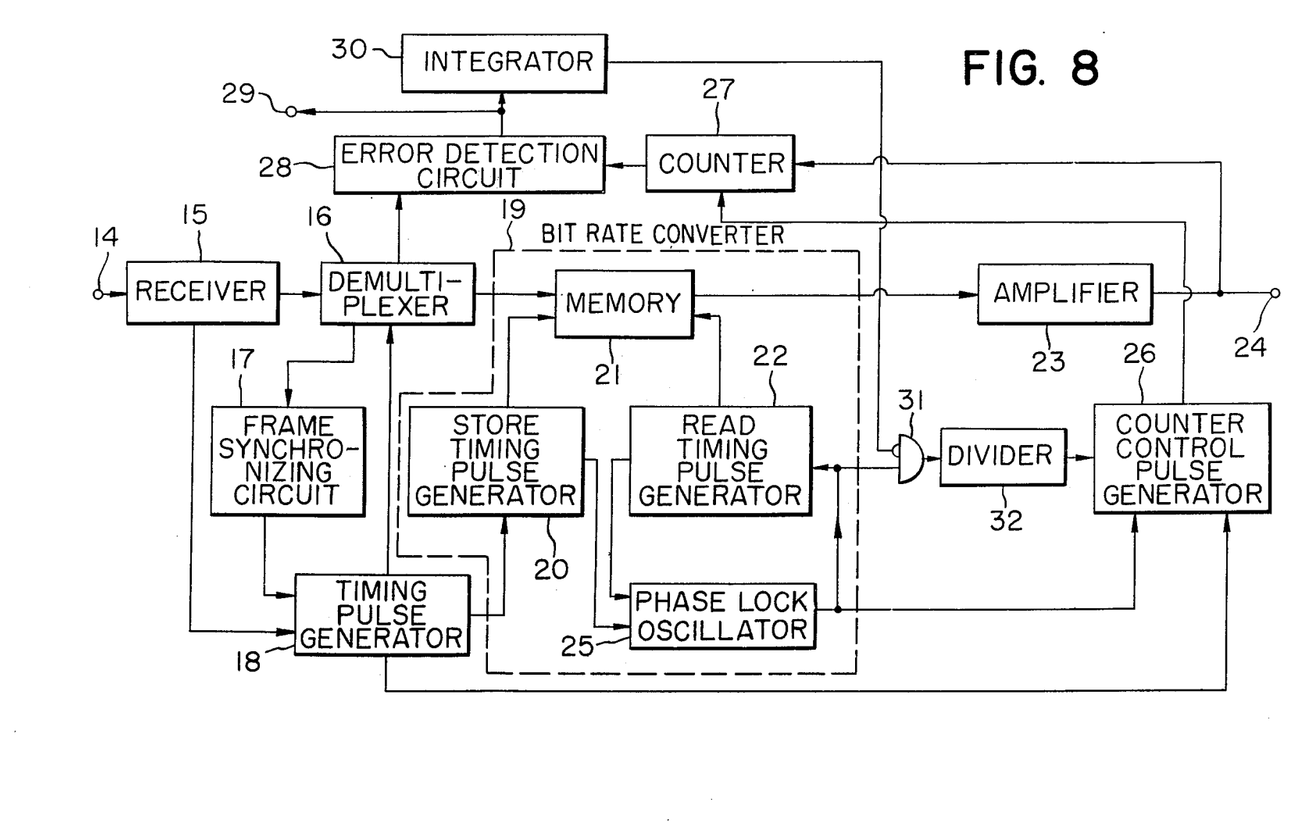
FIG. 8 is a block diagram of a receiving equipment thereof.

The receiving equipment of the third embodiment shown in block diagram form in FIG. 8 is substantially similar in construction to that of the second embodiment except that a frequency divider 32 is inserted between the inhibit gate 31 and the counter control pulse generator 26. The frequency divider 32 steps down the frequency of the output pulses of the phase lock oscillator 25 into 1/r so that the following relation
$$n = v \times r$$
may be satisfied,
when $n =$ the number of information bits in each frame; and
$v =$ an integer
$r =$ an integer.

In addition to the output of the frequency divider 32, the frame synchronizing pulse F of the timing pulse generator 18 and the output pulses of the phase lock oscillator 25 are also applied to the counter control pulse generator 26.

Figure 10:
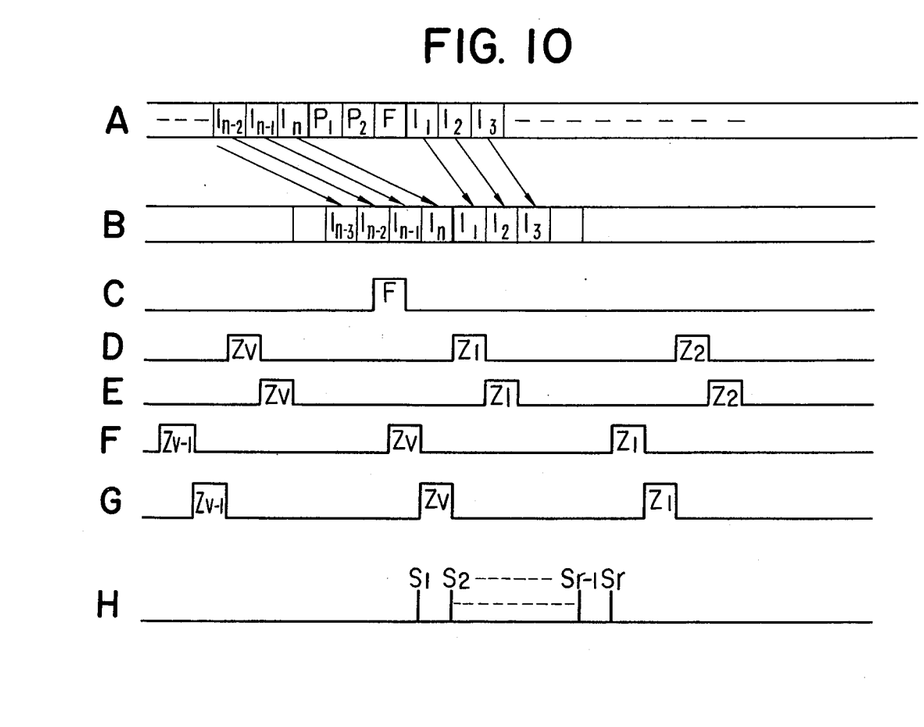

Next referring to FIG. 10, the mode of the receiving equipment with the above construction will be described. The pulse train shown in FIG. 10A and applied to the input terminal 14 of the receiving equipment is converted by the bit rate converter 19 into the train of successive information bits $I_1$ through $I_n$ excluding the frame synchronizing pulse F and the check bits $P_1$ and $P_2$. The frame synchronizing pulse F shown in FIG. 10C and the output of the frequency divider 32 shown in FIGS. 10D (10E, 10F, or 10G) are applied to the counter control pulse generator 26. As described above, the counter 10 in the transmitter equipment is started a predetermined time after the frame synchronizing pulse F. For instance, the counter 10 is actuated at one of the timing points $S_2$ through $S_{r-1}$ shown in FIG. 10H, and $n$, $r$, and $v$ of the above relation $n = v \times r$ are so selected that the first output pulse $Z_1$ of the frequency divider 32 after the frame synchronizing pulse F may appear between the points $S_2$ and $S_{r-1}$. Then the counter control pulse generator 26 is actuated in response to the pulse $Z_1$ to generate the counter control pulses so that the counter 27 may operate during the time interval $t_1$, and then may interrupt its operation during the time interval $t_2$. When the output pulses of the counter control pulse generator 26 are not in synchronism with those of the counter control pulse generator 11 in the transmitter equipment, the error pulses are frequently derived from the error detection circuit 28. When the integrated value of the error pulses becomes in excess of a predetermined value, the inhibit gate 31 is actuated as in the case of the second embodiment. Consequently the output of the frequency divider 32 is shifted in phase as shown in FIG. 10E. When the inhibit gate 31 is actuated coincidently with the actuation of the counter control pulse generator 26 at the time point $S_r$ as shown in FIG. 10F, the starting pulse returns to the time point $S_1$ as shown in FIG. 10G. However, as described above, the counter control pulse generator 11 in the transmitter equipment is actuated only between the time points $S_1$ and $S_r$ so that the synchronization may be attained between the time points $S_1$ and $S_r$. Therefore it is not necessary to attain the synchronization of all timings in each frame.

What is claimed is:
1. A digital code monitor system comprising
   A. a transmitting equipment comprising
      a. bit-rate converting means for forming time slots by the bit rate conversion of an information pulse train
      b. means for forming a check code representing the states of bits in a block consisting of a predetermined number of bits of said information pulse train before bit rate conversion and
      c. means for inserting said check code and a frame synchronizing pulse into said time slots and transmitting said bit-rate converted information pulse train with said check code and said frame synchronizing pulse inserted therein to a receiving equipment; and
   B. said receiving equipment comprising
      a. means for extracting said check code and said frame synchronizing pulse from transmitted pulse train,
      b. means for bit-rate converting said transmitted pulse train,
      c. means for forming, in a manner exactly similar to that of forming said check code in said transmitting equipment, a check code from a bit-rate converted information pulse train, and
      d. means for comparing said extracted check code with said second mentioned check code formed in said receiving equipment so as to detect whether said extracted and formed check codes coincide with each other or not.
2. A digital code monitor system as defined in claim 1 wherein
   the forming of said check code in said transmitting equipment is controlled by means of timing pulses derived from said bit-rate converting means, and the forming of said second mentioned check code in said receiving equipment is controlled by means of the timing pulses derived from said bit-rate converting means in said receiving equipment.
3. A digital code monitor system as defined in claim 1 wherein
   said bit-rate converting means in said transmitting and receiving equipments includes storage means whose capacity is equal to an integral submultiplier of the number of bit-rate converted information bits in each frame.
4. A digital code monitor system as defined in claim 1 wherein
   a control pulse for forming the check code from said bit-rate converted pulse train in said receiving equipment is synchronized with a control pulse for forming the check code from said information pulse train before bit rate conversion in the transmitting equipment by shifting the phase of said first-mentioned control pulse formed from the read timing pulse in said bit-rate converter, in case of exceeding the predetermined integrated value of error pulses derived when said extraction check code does not coincide with the check code formed in said receiving equipment.
5. A digital code monitor system as defined in claim 4 wherein
   the start point with which said check code is formed from said information pulse train in said transmitting equipment and the start point with which said check code is formed from said bit rate converted information pulse train in said receiving equipment are generated within a predetermined time from the time generating the frame synchronizing pulse.

* * * * *